United States Patent
Kuc

(10) Patent No.: US 9,788,202 B2
(45) Date of Patent: Oct. 10, 2017

(54) METHOD OF ACCESSING A WLAN ACCESS POINT

(71) Applicant: GEMALTO SA, Meudon (FR)

(72) Inventor: Jean-François Kuc, La Ciotat (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 14/413,593

(22) PCT Filed: Jun. 18, 2013

(86) PCT No.: PCT/EP2013/062581
§ 371 (c)(1),
(2) Date: Jan. 8, 2015

(87) PCT Pub. No.: WO2014/009109
PCT Pub. Date: Jan. 16, 2014

(65) Prior Publication Data
US 2015/0208237 A1    Jul. 23, 2015

(30) Foreign Application Priority Data
Jul. 10, 2012    (EP) .................................... 12305827

(51) Int. Cl.
*H04L 29/06* (2006.01)
*H04W 12/06* (2009.01)
(Continued)

(52) U.S. Cl.
CPC ............. *H04W 12/06* (2013.01); *H04L 63/08* (2013.01); *H04L 63/0853* (2013.01);
(Continued)

(58) Field of Classification Search
None
See application file for complete search history.

(56) References Cited

U.S. PATENT DOCUMENTS

2004/0162105 A1    8/2004   Reddy et al.
2005/0010758 A1*   1/2005   Landrock et al. ............ 713/156
(Continued)

FOREIGN PATENT DOCUMENTS

EP    1 770 940 A1    4/2007

OTHER PUBLICATIONS

International Search Report (PCT/ISA/210) mailed on Sep. 6, 2013, by the European Patent Office as the International Searching Authority for International Application No. PCT/EP2013/062581.
(Continued)

*Primary Examiner* — David Le
(74) *Attorney, Agent, or Firm* — Buchanan Ingersoll & Rooney PC

(57) ABSTRACT

The invention is a method for authorizing a device to establish a communication session with an access point of a WLAN. A secure token comprises a data related to a telecom network subscription and is connected to the device. The device comprises credentials required for establishing the communication session with the access point. The method comprises the following steps: asking the secure token to initiate an authentication by using the data, running an authentication process initiated by the secure token by using the data and a communication channel provided by the telecom network, in case of successful authentication, sending an authentication pattern from the secure token to the device, authorizing use of the credentials thanks to the authentication pattern in the device and establishing the communication session between the device and the access point by using said credentials.

11 Claims, 2 Drawing Sheets

(51) Int. Cl.
*H04W 76/02* (2009.01)
*H04W 84/12* (2009.01)

(52) U.S. Cl.
CPC .......... *H04L 63/0892* (2013.01); *H04L 63/18* (2013.01); *H04W 76/021* (2013.01); *H04W 84/12* (2013.01)

(56) References Cited

U.S. PATENT DOCUMENTS

| | | | | |
|---|---|---|---|---|
| 2005/0105734 A1* | 5/2005 | Buer | ................. | G07C 9/00007 380/270 |
| 2008/0313707 A1* | 12/2008 | Jain | ........................ | H04L 63/08 726/2 |
| 2009/0161636 A1* | 6/2009 | Collins | ............. | H04W 72/0446 370/336 |
| 2010/0041424 A1* | 2/2010 | Osborn | ........................ | 455/466 |
| 2012/0265996 A1* | 10/2012 | Kaal | .................... | H04L 63/102 713/182 |

OTHER PUBLICATIONS

Written Opinion (PCT/ISA/237) mailed on Sep. 6, 2013, by the European Patent Office as the International Searching Authority for International Application No. PCT/EP2013/062581.

* cited by examiner

METHOD OF ACCESSING A WLAN ACCESS POINT

FIELD OF THE INVENTION

The present invention relates to methods of accessing an access point of a wireless local area network (WLAN). It relates particularly to methods of authorizing a device to establish a communication session with a WLAN access point.

BACKGROUND OF THE INVENTION

Secure tokens are small devices comprising a memory, a microprocessor and an operating system for computing treatments. In general, secure tokens comprise a plurality of memories of different types. For example, they may comprise memory of RAM, ROM, EEPROM or Flash type. Secure tokens have limited computing resources. For example, smart cards are secure tokens.

A wireless local area network links two or more devices through a wireless protocol. An access point (also named hotspot) allows connecting the WLAN. Additionally, the access point may be connected to public or private networks. A WLAN provides networks access to user which may be static or mobile in a local area. Such hotspots can be found in hotels and trains for example. One of the most popular wireless LANs is the Wi-Fi™ defined by the Wi-Fi Alliance and specified in the group of IEEE 802.11 standards. Access to hotspots may be limited by security mechanisms like the Wired Equivalent Privacy (WEP) or the Wi-Fi Protected Access (WPA).

The Extensible Authentication Protocol Method for GSM Subscriber Identity Module, or EAP-SIM, is an Extensible Authentication Protocol (EAP) mechanism for authentication and session key distribution using the Subscriber Identity Module (SIM) from the Global System for Mobile (GSM) Communications. The EAP-SIM is defined by ETSI TS 102.310.

The Extensible Authentication Protocol EAP-SIM protocol allows an access point to get data from a SIM in order to exchange authentication data with an authentication server that interfaces with a Home Location Register (HLR) of a Telecom network. Thus authentication is run between the access point and the HLR to authenticate the user using the SIM. The EAP-SIM scheme requires that the access point has specific features dedicated to the EAP-SIM protocol for managing data exchanged with a SIM and an authentication server.

Unfortunately, a lot of access points are already deployed without EAP-SIM features.

When a user needs to use a WLAN access point, there is a need to authenticate the user using the SIM without upgrading the already deployed access points.

SUMMARY OF THE INVENTION

An object of the invention is to solve the above mentioned technical problem.

The object of the present invention is a method for authorizing a device to establish a communication session with an access point of a wireless local area network (WLAN). A secure token comprises a data corresponding to a subscription to a telecom network and is connected to the device. The device comprises credentials required for establishing the communication session with the access point. The method comprises the following steps:

asking the secure token to initiate an authentication by using said data, running an authentication process initiated by the secure token by using said data and a communication channel provided by the telecom network, in case of successful authentication, sending an authentication pattern from the secure token to the device, authorizing use of the credentials thanks to the authentication pattern in the device and establishing the communication session between the device and the access point by using said credentials.

Advantageously, the authentication process may be performed by using a SMS channel or a USSD channel.

Furthermore, the telecom network may comprise a Home Location Register, the authentication process may be carried out between the secure token and the Home Location Register, and the secure token and the Home Location Register may exchange messages through an authentication server and a Home Location Register gateway.

Furthermore, the authentication process may be carried out between the secure token and an authentication server without using a Home Location Register.

Advantageously, the wireless local area network may be compliant with Wi-Fi™ or WiMAX™.

Another object of the invention is a device able to connect a secure token comprising a data corresponding to a subscription to a telecom network. The device comprises credentials required for establishing a communication session with an access point of a wireless local area network. The device comprises a communication means able to establish the communication session with the access point. The device comprises a connection manager adapted to ask the secure token to initiate an authentication to the telecom network, to run a checking of an authentication pattern provided by the secure token and in case of successful checking to authorize use of the credentials to the communication means.

Another object of the invention is a secure token able to connect a device intended to communicate with a WLAN access point. The secure token comprises a data corresponding to a subscription to a Telecom network. The secure token comprises an initiator means adapted to initiate an authentication process by using the data and a communication channel provided by the Telecom network. The secure token comprises an activating means adapted to provide the device with an authentication pattern which authorizes the device to establish a communication session with the WLAN access point.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any type of devices able to connect a secure token, able to communicate with a WLAN access point and able to retrieve the credentials required for establishing a communication session with a WLAN access point. For example, the device may be a smart phone, a laptop, a tablet PC, a game console or any computer.

Figure 1:
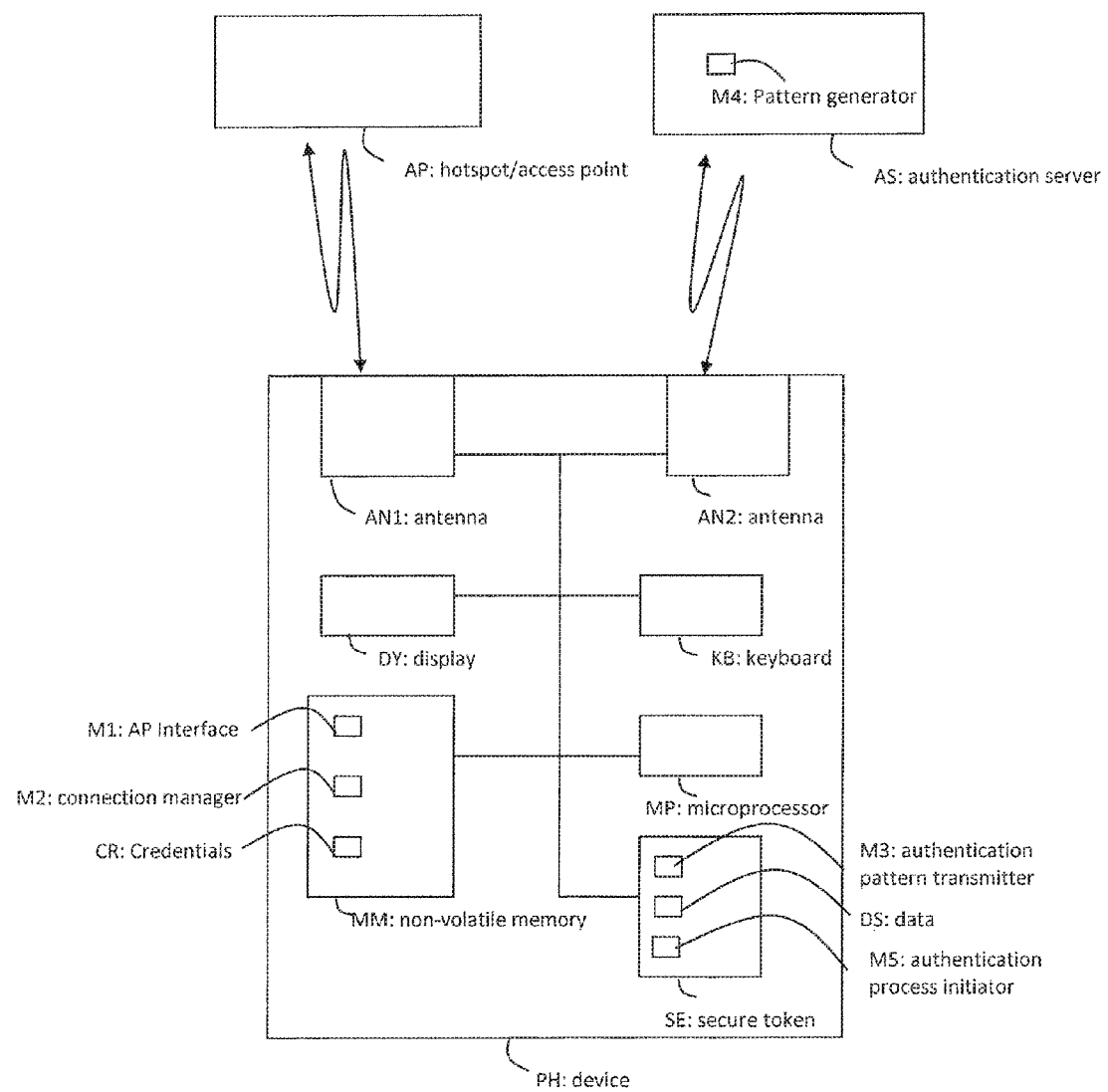
FIG. 1 depicts schematically an example of architecture of a device according to the invention.

FIG. 1 shows the architecture of a device PH of mobile phone type according to a preferred embodiment of the invention.

The device PH comprises a non-volatile memory MM, a microprocessor MP, a display DY, a keyboard KB, two antennas AN1 and AN2 and a secure token SE. The secure token SE may be connected either in a fixed manner or in a removable manner to the device PH.

The memory MM comprises an operating system OS (not shown), credentials CR corresponding to a WLAN access point AP, a communication means M1 and a connection manager M2.

In a preferred embodiment, the device PH is a mobile phone. Alternatively, the device PH may be a personal computer, a tablet PC, a printer, a camera, or any computer designed to access a WLAN.

The device PH is able to communicate with a WLAN access point through the antenna AN1. For example, the antenna AN1 may be able to communicate according to Wi-Fi™ as specified by IEEE 802.11b. The device PH is able to communicate with a telecom network through the antenna AN2. For instance, the telecom network may be a GSM/UMTS network. The device PH is able to communicate with the connected secure token SE.

The communication means M1 is adapted to establish a communication session with a WLAN access point. The connection manager M2 is adapted to ask the secure token SE to initiate an authentication by using features of the telecom network. The connection manager M2 is adapted to check an authentication pattern PN retrieved from the secure token SE and to authorize use of the credentials CR to the communication means M1 in case of successful checking. The credentials CR may be a Wi-Fi Protected Access (WPA or WPA2) key or a Wired Equivalent Privacy (WEP) key as defined by IEEE 802.11i. The credentials CR may also comply with another standard or may be a proprietary security protocol. The credentials CR may also be a set comprising any combination of elements selected in the following list: the type of access (i.e. WEP or WPA2), the communication protocol, the security algorithm and the secure data (key) to use for connecting a WLAN access point. The communication means M1 cannot use the credentials CR while the authorization is not provided by the connection manager M2. For instance, the communication means M1 may have no access to the credentials CR while the authorization is not provided by the connection manager M2.

The secure token SE comprises data DS corresponding to a subscription to a Telecom network. The data DS allows to authenticate the token SE to the telecom network. The secure token SE is able to receive an authentication pattern from an authentication sever. The secure token SE comprises an activating means M3 adapted to send an authentication pattern to the device PH. The secure token SE comprises an initiator means M5 adapted to initiate an authentication process by using the data DS and a communication channel provided by the Telecom network.

Advantageously, the activating means M3 is able to trigger the establishment of a communication session between the device PH and a WLAN access point.

In a preferred embodiment, the secure token SE is a Universal Integrated Circuit Card (UICC).

The device PH is able to access the Telecom network through an authentication server AS. In other words, the server AS is an access point for the Telecom network.

Advantageously, the authentication server AS comprises a generator means M4 adapted to generate an authentication pattern PN corresponding to a targeted WLAN access point.

The authentication server AS is able to communicate with a Home Location Register (HLR) either directly or via a HLR gateway. A HLR comprises a database that contains details of each mobile phone subscriber which is authorized to use the Telecom network. The HLR is able to run a mutual authentication with a UICC.

Advantageously, the device PH may comprise a database storing a plurality of credentials.

Figure 2:
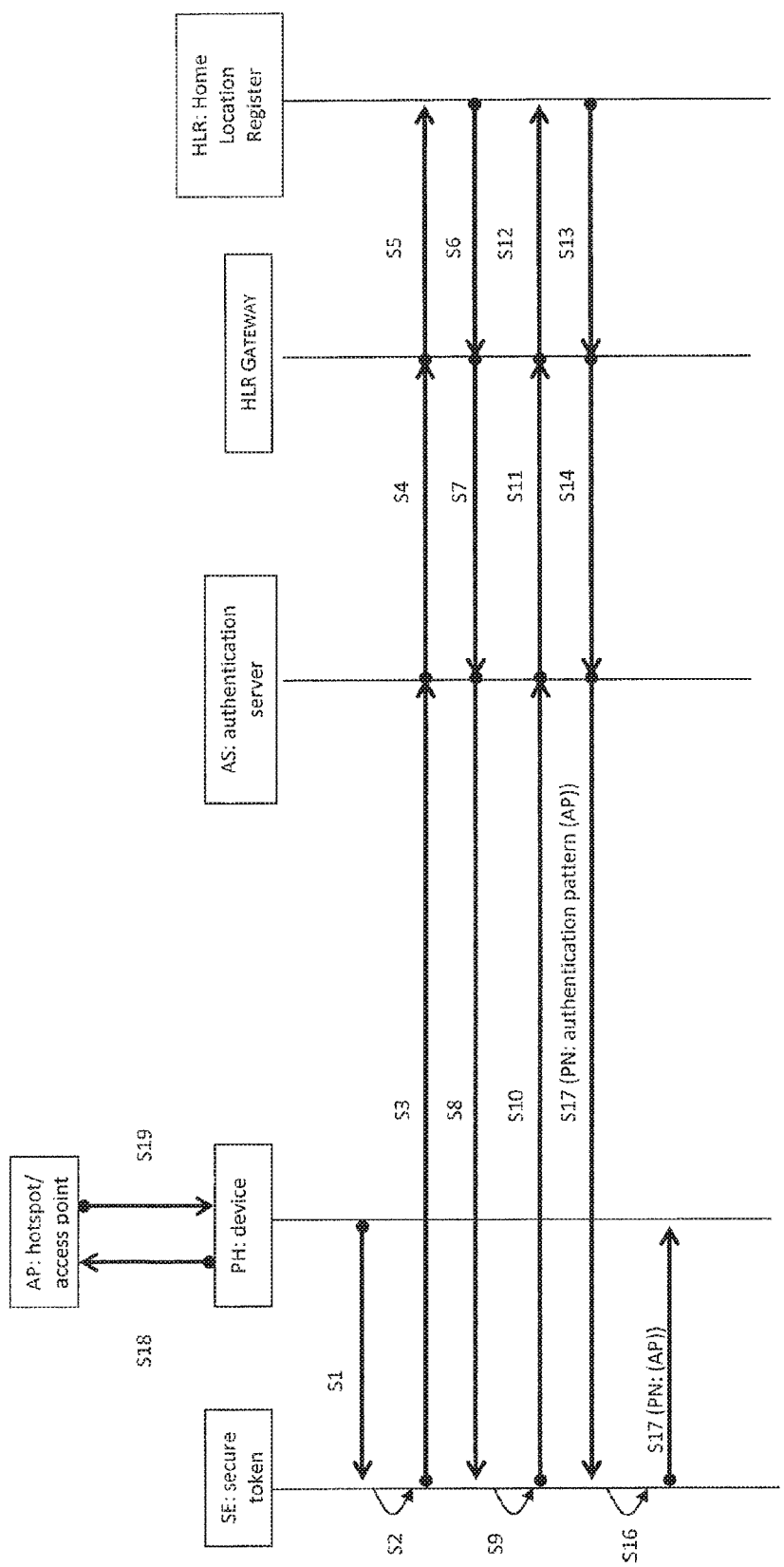
FIG. 2 is an example of a flowchart of accessing a WLAN access point according to the invention.

FIG. 2 shows an example of a flowchart of accessing a WLAN access point according to the invention.

The device PH, the secure token SE and the authentication server AS are similar to those of FIG. 1.

The secure token SE is assumed to contain the Subscriber Identity corresponding to the user of the device PH. When the user of the device PH wants to use a WLAN, a request is sent from the device PH to the secure token SE at a first steps S1. This first request aims at requesting the authentication of the user via the data DS of the secure token SE. Optionally, this request may be sent automatically by the device PH when a preset event occurs (e.g. detection of the vicinity of a WLAN access point, a date, or any event which may be triggered by an application).

At step S2, the secure token SE retrieves the data required for the authentication to the Telecom network. At step S3, the secure token SE sends the retrieved data to the authentication server AS. The retrieved data may be sent according to a format compliant with a "EAP response/SIM/start" as defined by IETF RFC 4186. The retrieved data may be sent by using a Short Message Service (SMS) channel as defined by 3GPP TS 23.040. The retrieved data may be sent by using the Unstructured Supplementary Service Data (USSD) channel as defined by 3GPP TS 22.090 and 3GPP TS 23.090. Then the authentication server AS uses the received data for starting an authentication process with the HLR at step S4. The HLR is a Home Location Register of the home Mobile Network operator (MNO) of the Telecom network. (I.e. the user of the secure token SE has a subscription to this MNO). This starting may be initiated by sending a request to the HLR gateway by using a format compliant with a "Request GSM triplets" as defined by 3GPP TS 29.002 standard and IETF RFC 4186. For instance, the request may be sent through Internet Protocol (IP). At step S5, the HLR gateway forwards the request to the HLR. In response, the HLR sends a set of values targeting the secure token SE at step S6. In a preferred embodiment, the set of values comprises a random value. The set of values may be sent to the HLR gateway by using a format compliant with a "GSM triplets" as defined by 3GPP TS 29.002 standard and IETF RFC 4186. A step S7, the HLR gateway forwards the set to the authentication server AS. At step S8, the authentication server AS sends a message to the token SE for requesting a computation based on the set of values. The message may have a format compliant with a "Check GSM triplets" as defined by 3GPP TS 29.002 standard and IETF RFC 4186. At step S9, the secure token SE run the authentication algorithm by using the received set of values and generates a challenge. The authentication algorithm may be the A3 or A8 algorithms usually run in Telecom domain. A step S10, the secure token SE sends the result of the execution of the algorithm and the challenge to the authentication server AS. The data may be sent according to a format compliant with a "EAP response/SIM Challenge" as defined by IETF RFC 4186. The authentication server AS checks the received data and in case of success sends a notifying message to the HLR gateway at step S11. The notification message may have a format compliant with "Update HLR" as defined by 3GPP TS 29.002 standard. A step S12, the HLR gateway forwards the notification message to the HLR. In response, the HLR sends a message comprising element related to the user's subscription to the gateway HLR at step S13. This message may be sent according to a format compliant with "Insert subscriber" as defined by 3GPP TS 29.002 standard. A step S14, the HLR gateway forwards the message to the authentication server AS. Note that the transport protocol used between the HLR and the HLR gateway may be different from the transport protocol used between the HLR gateway and the authentication server AS. For instance, the HLR and HLR gateway may communicate thanks to SS7/MAP (Signaling System No7/Mobile Application Part) while HLR gateway and the authentication server AS communicate thanks to the Internet Protocol. At step S15, the authentication server AS sends a consent message to the secure token SE. The consent message contains an authentication pattern PN. In other words, the authentication pattern PN aims at authorizing the connection of the device PH to the targeted hotspot AP. Preferably, the authentication pattern PN is generated by the authentication server AS. At step S17, the secure token SE sends an unlocking message to the device PH. The unlocking message contains the authentication pattern PN. For example, the unlocking message may aim at launching a browser on the device PH by using the STK (SIM Toolkit) mechanism. The authentication pattern PN allows the device PH to use the credentials CR. At step S18, the device PH starts the establishment of a communication session with the access point AP by using the credentials CR. At step S19, the access point sends an acknowledgement message to the device PH when the device PH is authenticated and the session is established. Then the device PH may access to the resources of the WLAN through the access point AP.

If the mutual authentication between the secure token SE and the telecom network fails, the device PH is not authorized to connect the access point AP.

Alternatively, the authentication pattern PN may be supplied to the authentication server AS by the HLR.

Advantageously, the authentication pattern PN may contains a value which specifies a maximum size of data that may be exchanged between the device PH and the access point AP.

Advantageously, the authentication pattern PN may contain a value which specifies a period of validity of the communication session.

Advantageously, the access point AP may provide the authentication server AS with consumption data after the establishment of the communication session between the device PH and the access point AP. Such a consumption data aims at reflecting the communication exchanges between the device PH and the access point AP. Thus the authentication server AS may be able to manage billing associated to the use of the access point.

The WLAN access point may communicate with the device PH according to Wi-Fi™, WiMAX™ or any wireless protocol suited for a local area. The invention is well-suited for managing access to a hotspot for which the user does not have an account.

Although the process described at FIG. 2 is based on numerous exchanges between the secure token SE and the HLR, the method of the invention can be performed using other authentication schemes. For example, the authentication server AS may send messages to the HLR without going through a HLR gateway. In another example, the authentication process may be performed by using a 3-DES-based algorithm which is run in the authentication server AS. In this case, the authentication server AS is not a HLR and no HLR is used for the authentication of the secure token SE.

Advantageously, the device PH can contain multiple credentials corresponding to as many access points.

Advantageously, the device PH can get the configuration of the hotspot AP before asking the secure token SE to start the authentication process. The hotspot configuration may be provided to the authentication server AS which can use the configuration for generating an authentication pattern PN customized for the hotspot AP.

According to the invention, the authorization to establish a communication session with a WLAN access point is supplied to the device PH without going through the access point. Thus the access point is not involved in the authentication of the user. (i.e. in the authentication of the secure token SE).

The invention claimed is:

1. A method for authorizing a device to establish a wireless communication session with an access point of a wireless local area network, wherein a secure token comprising data corresponding to a subscription to a telecom network is connected to said device, the secure token having limited computing resources compared to the device, said device comprising pre-stored credentials required for establishing the communication session with said access point,
   wherein the device is unable to use the pre-stored credentials when the device has not successfully checked a corresponding authentication pattern provided by the secure token,
   wherein the pre-stored credentials are specific to the access point, and
   wherein the method comprises:
      receiving a request by the secure token to initiate an authentication by using said data, the pre-stored credentials being stored in the device before the request is received by the secure token,
      running an authentication process initiated by the secure token by using said data for authentication to the telecom network,
      when authentication with the telecom network is successful, transmitting an unlocking message including the authentication pattern from the secure token to the device, authorizing use of the pre-stored credentials based on the authentication pattern in the device, and establishing the communication session between the device and the access point by using said pre-stored credentials,
   wherein the communication session between the device and the access point uses a communication protocol different from the communication protocol used for authentication with the telecom network.

2. A method according to claim 1, wherein the authentication process is performed by using a SMS channel or a USSD channel.

3. A method according to claim 1, wherein the telecom network comprises a Home Location Register, wherein the authentication process is carried out between the secure token and the Home Location Register, and wherein said secure token and said Home Location Register exchange messages through an authentication server and a Home Location Register gateway.

4. A method according to claim 1, wherein the authentication process is carried out between the secure token and an authentication server without using a Home Location Register.

5. A method according to claim 1, wherein the wireless local area network is compliant with Wi-Fi™ or WiMAX™.

6. A device able to connect a secure token comprising data corresponding to a subscription to a telecom network, the secure token having limited computing resources compared to the device, said device comprising pre-stored credentials required for establishing a wireless communication session with an access point of a wireless local area network and being able to establish the wireless communication session with the access point,
wherein the pre-stored credentials are specific to the access point,
wherein the device is unable to use the pre-stored credentials when the device has not successfully checked a corresponding authentication pattern provided by the secure token, and
wherein the device is configured to:
transmit a request to the secure token to initiate an authentication to the telecom network, to run a checking of the authentication pattern included in an unlocking message provided by the secure token and in case of successful checking to authorize use of the pre-stored credentials to establish the wireless communication session with the access point,
wherein the pre-stored credentials are already stored in the device before the device requests the secure token to initiate an authentication with the telecom network, and
wherein the communication session between the device and the access point uses a communication protocol different from the communication protocol used for authentication with the telecom network.

7. A system comprising:
a secure token connected to a device, the secure token having limited computing resources compared to the device,
an authentication server, and
a Home Location Register,
wherein the device is able to connect a secure token comprising data corresponding to a subscription to a telecom network, said device comprising pre-stored credentials required for establishing a wireless communication session with an access point of a wireless local area network and being able to establish the wireless communication session with the access point,
wherein the pre-stored credentials are specific to the access point,
wherein the device is unable to use the pre-stored credentials when the device has not successfully checked a corresponding authentication pattern provided by the secure token,
wherein the device is configured to request the secure token to initiate an authentication to the telecom network, to run a checking of the authentication pattern included in an unlocking message provided by the secure token and, in case of successful checking, to authorize use of the pre-stored credentials to establish the wireless communication session with the access point,
wherein the credentials are already stored in the device before the device requests the secure token to initiate an authentication with the telecom network,
wherein the secure token exchanges messages with the Home Location Register through the authentication server,
wherein said secure token comprises data corresponding to a subscription to a Telecom network,
wherein the secure token is configured to initiate an authentication process by using the data and a communication channel provided by the Telecom network,
wherein the secure token is configured to provide the device with the authentication pattern, and
wherein the communication session between the device and the access point uses a communication protocol different from the communication protocol used for authentication with the telecom network.

8. A system according to claim 7, wherein the authentication server is configured to generate the authentication pattern.

9. The method of claim 1, wherein the device is physically coupled to the secure token.

10. The device of claim 6, wherein the device is physically coupled to the secure token.

11. The system of claim 7, wherein the device is physically coupled to the secure token.

* * * * *